United States Patent [19]

Bates

[11] Patent Number: 5,566,460
[45] Date of Patent: Oct. 22, 1996

[54] TELESCOPIC MEASURING POLE

[75] Inventor: Steven W. Bates, Bella Vista, Calif.

[73] Assignee: SECO Manufacturing Co., Inc., Redding, Calif.

[21] Appl. No.: 282,056

[22] Filed: Jul. 28, 1994

[51] Int. Cl.⁶ ................................................. G01C 15/06
[52] U.S. Cl. ................................................. 33/296; 33/293
[58] Field of Search ............................. 33/293, 294, 295, 33/296, 464; 285/302, 303; 292/305, 306

[56] References Cited

U.S. PATENT DOCUMENTS

| | | | |
|---|---|---|---|
| 577,905 | 3/1897 | Wilson | 33/296 |
| 707,225 | 8/1902 | Goodale | 33/296 |
| 905,442 | 12/1908 | Lenker | 33/294 |
| 1,224,938 | 5/1917 | Lenker | 33/294 |
| 2,346,479 | 4/1944 | Fatkin | 33/294 |
| 3,492,729 | 2/1970 | Crain | 33/296 |
| 4,899,452 | 2/1990 | Schafer | 33/296 |
| 5,031,328 | 7/1991 | Bhaumik | 33/293 |
| 5,255,441 | 10/1993 | Burgess et al. | 33/296 |

FOREIGN PATENT DOCUMENTS

| | | | |
|---|---|---|---|
| 111426 | 6/1900 | Germany | 33/295 |
| 15165 | of 1902 | United Kingdom | 33/296 |
| 2017913 | 10/1979 | United Kingdom | 33/293 |

OTHER PUBLICATIONS

SECO Manufacturing Catalog "Surveying Equipment Accessories" Published 1994 by SECO Manufacturing (1994).

*Primary Examiner*—William A. Cuchlinski, Jr.
*Assistant Examiner*—G. Bradley Bennett
*Attorney, Agent, or Firm*—Coudert Brothers

[57] ABSTRACT

The telescopic measuring pole consists of an extensible pole which can be adjusted between a length of 32.5 inches and 15.5 feet. The pole has a removable hardened point on one end and accommodates prisms or receivers of various technologies via an adapter on its opposite end. The pole utilizes an over-center cam lever to clamp the telescoping tubes in precise fixed positions relative to one another. The clamping mechanism is designed and manufactured to minimize friction and galling, and can be operated with one hand.

2 Claims, 3 Drawing Sheets

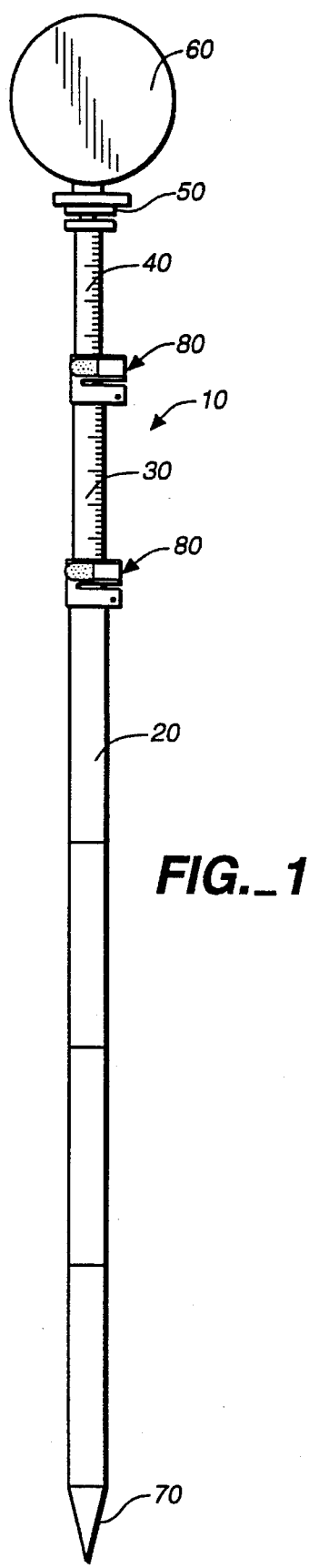
FIG._1
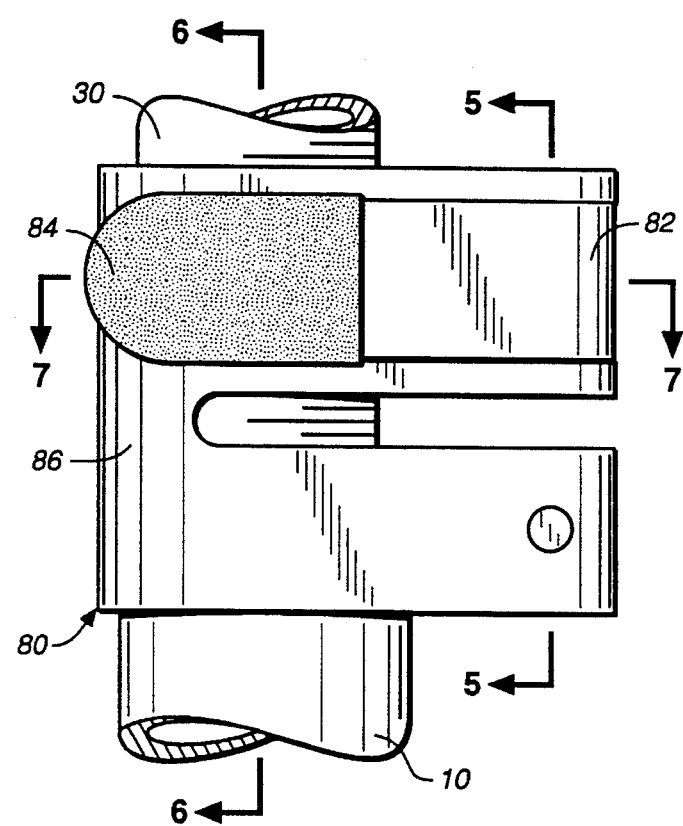
FIG._4
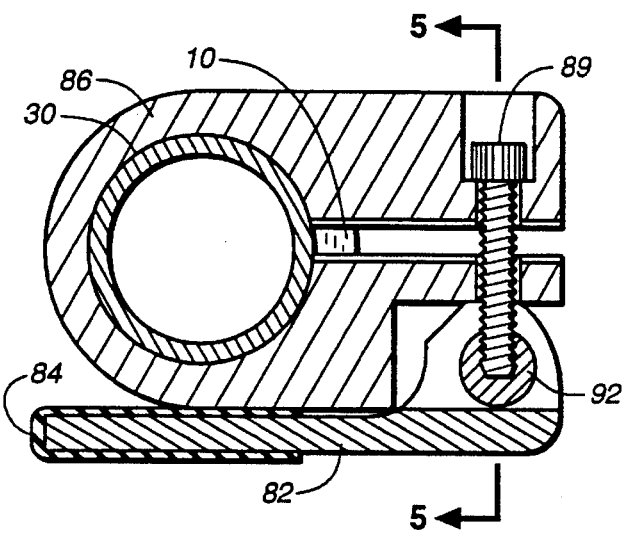
FIG._7

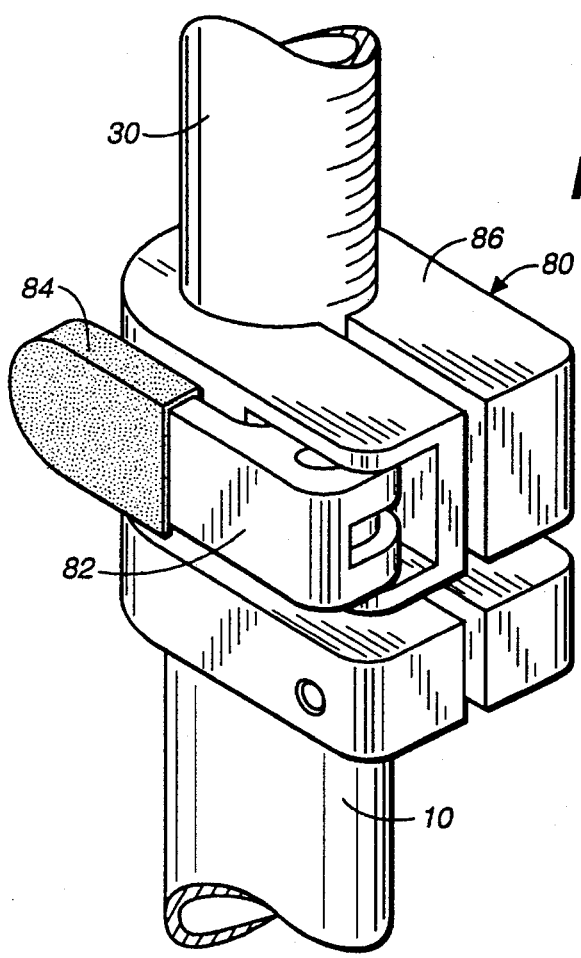
FIG._2
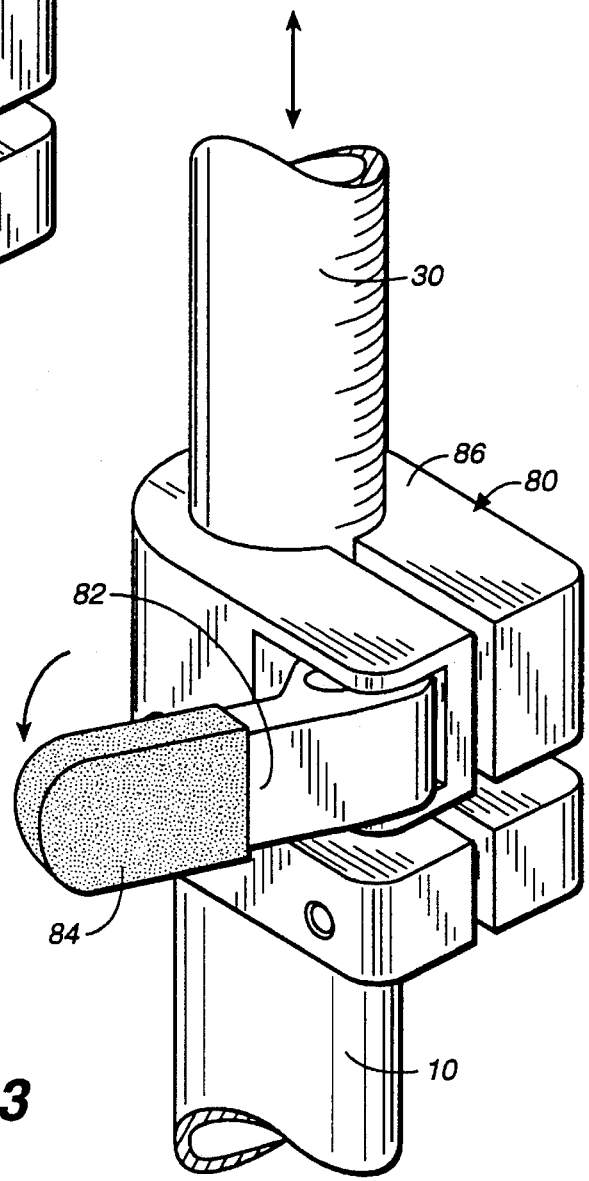
FIG._3

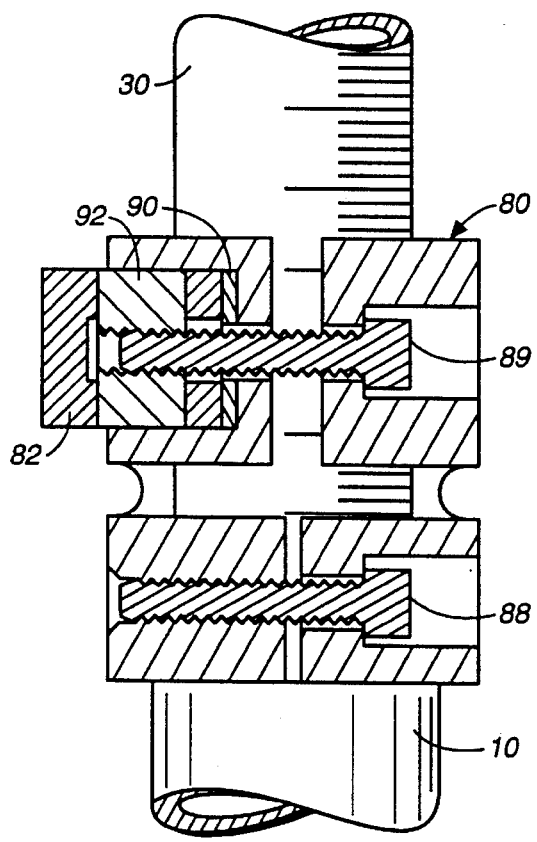
FIG._5
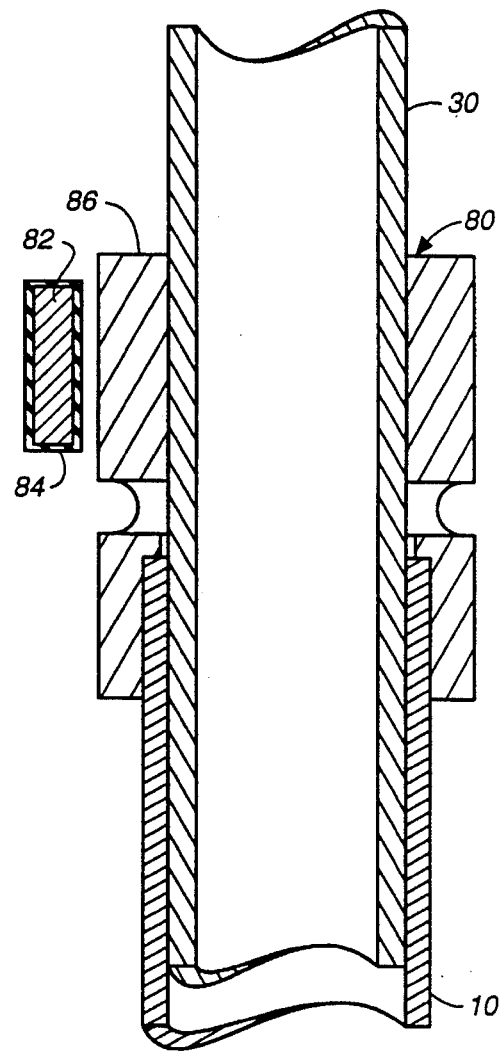
FIG._6

TELESCOPIC MEASURING POLE

SPECIFICATION

Background of the Invention

The invention pertains generally, to surveying systems and, in particular, to an improved measuring pole for surveying systems. This invention may be utilized in the form of a prism pole, laser grade rod, or other similar measuring pole.

Surveying systems are used for mapping and plotting purposes by identifying points on a three dimensional coordinate system. A typical system may employ a prism pole supporting a prism assembly or some other receiving system for positioning the prism or receiver over the point to be referenced, and an electronic or other device which emits a signal or beam that is reflected from the prism, or received by a receiving device, thereby resulting in a distance measurement and associated three-dimensional coordinates. These coordinates may be utilized for various design or mapping purposes.

Such measuring poles typically are constructed of light weight, high strength aluminum, and generally consist of an outer-bottom member having a hardened metal point (in the case of prism poles), and at least one inner-upper telescoping member. The metal point is utilized to position the prism pole precisely over the point to be referenced. Laser grade rods require no metal point. The top of the last upper-inner telescoping member is fitted with a prism assembly serving as the reflector of the signal generated by the electronic measuring device, held over another reference point. For laser rods or other measuring poles, instead of a prism assembly, a receiver compatible with the applicable technology is utilized.

Presently, a variety of sizes of poles are utilized from a few feet, to over fifteen feet. Having a plurality of telescoping upper-inner members allows surveyors to use one pole to reference points regardless of obstruction. Because of the popularity of telescoping poles, and the sensitivity of electronic measurement systems, the need has arisen for clamping devices which will allow zero movement of telescoping sections relative to each other.

Current clamping systems in use include set-screw systems which suffer from over-tightening, and require the use of two hands. The most widely used clamping system is the compression lock. this system is plagued by jamming and two hand operation. The Quick Release™ locking system, developed by SECO Manufacturing Co., Inc., has been the latest development in clamping technology, receiving excellent market acceptance. Even this Quick Release™, which may be used with only one hand, is not able to obtain a precise enough clamping force for today's most sensitive measuring technologies. In essence, a strong clamping system allowing no relative movement between telescoping sections, and which allows operation with only one hand has not been available in this art until the subject invention.

SUMMARY OF THE INVENTION

The measuring pole of the invention consists of extendable telescoping members varying in overall length from thirty-two and one-half inches to fifteen and one-half feet. The pole has a removable hardened point on the lower-outer member, and an adapter on the upper-inner member which can be changed to allow the use of referencing technologies. The material used is not limited to lightweight aluminum. Composite and other materials may also be employed as telescoping members.

The clamping means was developed to satisfy user requests for a locking mechanism which would significantly reduce the tendency for measuring poles (when extended) to collapse. Clamping force is achieved by rotating a lever with an over-center cam to squeeze the housing around the tube, or member, to be clamped. Friction is minimized by design of the clamp and coatings applied. Galling is effectively eliminated, as is relative movement, and operation is performed with one hand. The clamping mechanism assembly is installed on any telescoping section with the section to be clamped nested within.

BRIEF DESCRIPTION OF THE DRAWINGS

FIG. 1 shows the measuring pole of the invention, configured as a prism pole.

FIG. 2 shows the clamping mechanism in the locked position.

FIG. 3 shows the clamping mechanism in the unlocked position with lever open.

FIG. 4 is a front view of the clamping mechanism.

FIG. 5 is a cross-section of the clamping mechanism.

FIG. 6 is a longitudinal cross-section of the telescoping members showing the contact of the clamping assembly to said members.

FIG. 7 is an axial cross-section of the telescoping members showing the contact of the clamping assembly to said members.

DETAILED DESCRIPTION OF THE INVENTION

The telescopic measuring pole 10, in FIG. 1, consists of a plurality of members, 20, 30, 40, nested within one another and clamped by a means 80, the inner-most member having affixed to its top an adapter 50, which can accept a variety of devices 60, such as prisms, or electronic and laser receivers. At the bottom of the outer-most member is a point 70, for use when needed.

The clamping device 80, as depicted in FIG. 4, consists of a body 86, shaped as a split "U" shaped jaw, which is held against an outer member by a fastening means. The device compresses against in inner member via fastening means 89, shown in FIG. 7, which bears against a recessed shoulder on one side of the jaw, and is threadably engaged in a barrel nut 92, located in a lever 82, such that rotating the lever draws the jaw halves together by virtue of the lever's cam-like geometry. FIGS. 2 and 3 show the lever 82, in the locked and unlocked positions respectively.

FIG. 5 shows the first fastening means 88, which holds the clamping device 80 to an outer member 10. The relationship of lever 82, the second fastening means 89, and barrel nut 92, is also shown in FIG. 5. The cross-section further shows a slot in the lever which allows the barrel nut to rotate when the lever is opened or closed. Lever 82 bears against a washer 90, which is shown between the slotted portion of the lever and the clamping device body 86. These load bearing parts are coated with a proper mixture of dry film lubricant such as molybdenum disulfide and teflon to prevent galling.

FIG. 6 further discloses how the upper and lower jaw portions of body 86 contact outer member 10 and inner member 30. As in other views, a cover 84, is utilized on lever 82 in order to make the operation of the lever more comfortable for the user.

The relationship of outer member to inner member as defined by their size and the clamping device yields precise positioning, and can be applied to a plurality of members as shown in FIG. 1. Clamping force is adjusted by tightening the fastening means which compresses the body 86 against the upper inner member. The clamp may be operated with only one hand.

The apparatus and methods as described herein can be modified by those skilled in the art; the examples and illustrations are for explanatory purposes and are not intended to limit the scope of the appended claims.

What is claimed is:

1. An improved measuring pole comprising:

a plurality of tubes, each sized to fit movably within another with minimal axial play, the largest of said tubes having a removable pointed end and an open opposite end, the smallest of said tubes having a lower end and an upper end with threaded inside diameter, said tubes having graduated markings, said tubes taken in adjacent pairs constituting an outer tube and an inner tube, said tubes acting together as a telescoping system;

a plurality of lever-operated clamping devices one less in number than said plurality of tubes, said clamping devices capable of fixing said outer tubes in position relative to said inner tubes, said clamping devices operable utilizing only one hand;

said lever-operated clamping devices comprising a "U" shaped body having an upper jaw and a lower jaw, said lower jaw fitting snugly around said outer tube, said upper jaw fitting loosely around said inner tube, said jaws having a thread side and a shoulder side, said shoulder sides forming a recessed shoulder, said shoulders having a threaded bore perpendicular to said tubes' longitudinal axes, said lower jaw's thread side forming a threaded bore the same diameter as said lower jaw's shoulder side bore and concentric thereto, said upper jaw thread side forming a housing, said housing having a smooth bore concentric to said upper jaw's shoulder side bore;

a first screw threadably engaged through said lower jaw's shoulder side bore and said thread side bore such that tightening said first screw compresses said lower jaw against said outer tube, a lever having a cam-shaped pivot with open bore and forming a slot perpendicular to said bore, said slot extending partially along said pivot's circumference, said pivot having a coating of a dry film lubricant;

a barrel nut with threaded bore, fitted rotatably inside said open bore, said barrel nut having a coating of said dry film lubricant;

a washer, located between said lever and said housing, said washer having a coating of said dry film lubricant; and a second screw threadably engaged in said upper jaw's shoulder side extending through said washer and said slot into said barrel nut's threaded bore, such that tightening said second screw adjusts tension applied by closing said lever, rotating said cam-shaped pivot against said washer, thereby drawing said second screw against said upper jaw's shoulder, compressing said upper jaw against said inner tube such that said inner tube and said outer tube become fixed in position relative to each other.

2. An improved measuring pole comprising:

a plurality of tubes, each sized to fit movably within another with minimal axial play, the largest of said tubes having a removable pointed end and an open end, the smallest of said tubes having a lower end and an upper end with threaded inside diameter, said tubes having graduated markings, said tubes taken in adjacent pairs constituting an outer tube and an inner tube, said tubes acting together as a telescoping system;

a plurality of lever-operated clamping devices one less in number than said plurality of tubes, said clamping devices capable of fixing said outer tubes in position relative to said inner tubes, said clamping devices operable with only one hand, said clamping devices having first and second jaws, said first jaw affixed tightly around one of said outer tubes, said second jaw having on one side a means for drawing said jaw tightly around said adjacent inner tube, said second jaw having a second side forming a bearing area with a bore for receiving said drawing means therethrough, said clamping device having rotatably affixed thereto a lever with cam shaped end, said end attached to said drawing means such that when said lever rotates, said cam shaped end pivots against said bearing area advancing said drawing means through said bore thereby tightening said second jaw around said inner tube.

* * * * *